US008849478B2

(12) United States Patent
Coulmeau et al.

(10) Patent No.: US 8,849,478 B2
(45) Date of Patent: Sep. 30, 2014

(54) AIRCRAFT PILOTING ASSISTANCE METHOD AND CORRESPONDING DEVICE

(75) Inventors: Francois Coulmeau, Seilh (FR); Jerome Sacle, Toulouse (FR); Lionel Verot, Blagnac (FR)

(73) Assignee: Thales, Neuilly sur Seine (FR)

( * ) Notice: Subject to any disclaimer, the term of this patent is extended or adjusted under 35 U.S.C. 154(b) by 737 days.

(21) Appl. No.: 12/876,952

(22) Filed: Sep. 7, 2010

(65) Prior Publication Data

US 2011/0082605 A1 Apr. 7, 2011

(30) Foreign Application Priority Data

Sep. 4, 2009 (FR) ..................................... 09 04211

(51) Int. Cl.
*G06F 19/00* (2011.01)
*G06G 7/76* (2006.01)
*G08G 5/04* (2006.01)

(52) U.S. Cl.
CPC ..................................... *G08G 5/045* (2013.01)
USPC ............. 701/14; 701/3; 701/5; 701/6; 701/16

(58) Field of Classification Search
CPC ...................................................... G08G 5/045
USPC .......................................... 701/3, 5, 6, 14, 16
See application file for complete search history.

(56) References Cited

U.S. PATENT DOCUMENTS

| | | | | |
|---|---|---|---|---|
| 4,021,009 A * | 5/1977 | Baker et al. | ................... | 244/180 |
| 5,070,458 A * | 12/1991 | Gilmore et al. | ................. | 701/14 |
| 7,363,156 B2 * | 4/2008 | Winkler et al. | ............... | 701/301 |
| 2001/0056316 A1 * | 12/2001 | Johnson et al. | ................. | 701/14 |
| 2004/0245408 A1 * | 12/2004 | Peyrucain et al. | ............ | 244/183 |
| 2006/0212182 A1 * | 9/2006 | Shaw | .............................. | 701/12 |
| 2009/0041041 A1 * | 2/2009 | True et al. | ..................... | 370/401 |
| 2010/0100260 A1 * | 4/2010 | McIntyre et al. | ................. | 701/6 |
| 2010/0217461 A1 * | 8/2010 | Ledesma et al. | ................ | 701/18 |
| 2010/0222944 A1 * | 9/2010 | Blechen | ............................ | 701/6 |
| 2010/0318244 A1 * | 12/2010 | Gomez et al. | ..................... | 701/3 |

FOREIGN PATENT DOCUMENTS

| | | |
|---|---|---|
| EP | 1 764 628 | 3/2007 |
| EP | 1 812 917 | 8/2007 |
| FR | 2 887 065 | 12/2006 |
| FR | 2 893 146 | 5/2007 |
| WO | 2004/059445 | 7/2004 |
| WO | 2005/069094 | 7/2005 |

OTHER PUBLICATIONS

Search Report, issued on May 10, 2010, for FR 0904211, filed on Sep. 4, 2009.

* cited by examiner

*Primary Examiner* — Khoi Tran
*Assistant Examiner* — Jorge Peche
(74) *Attorney, Agent, or Firm* — Stroock & Stroock & Lavan LLP

(57) ABSTRACT

An aircraft piloting assistance method and system including determining at least one flyable slope with which the aircraft is assumed to be able to fly, based on a value of at least one flight parameter including the weight of the aircraft. The step for determining said slope or slopes with which the aircraft is able to fly, called flyable slopes is performed by a computer, and presenting the flyable slope to a decision-maker.

17 Claims, 2 Drawing Sheets

AIRCRAFT PILOTING ASSISTANCE METHOD AND CORRESPONDING DEVICE

CROSS-REFERENCE TO PRIOR APPLICATIONS

This application claims priority to French Patent Application No. 0904211, filed on Sep. 4, 2009, which is incorporated by reference in its entirety herein.

FIELD OF THE INVENTION

The present invention relates to an aircraft piloting assistance method intended more particularly to facilitate the tasks of the pilot with regard to the choice of a flight procedure, notably for diverting an aircraft from an initial flight plan or in a climb following a take-off.

BACKGROUND

The approach phase, that is to say, the period immediately preceding the landing, takes place in airport zones where traffic is dense. There are so-called precision approaches commonly called instrument approaches, or "low RNP" (RNP standing for "Required Navigation Performance") type approaches. By allocating a restricted air space to the aircraft, these approaches provide a solution to the significant increase in air traffic and make it possible to reduce the minimum landing decision thresholds (Minimum Decision Altitude MDA), to calculate curved approach flight plans minimizing flights over inhabited areas, to find new approach or departure paths in mountainous environments. To move in a space defined by an instrument approach, an aircraft must have sufficient performance levels to ensure the safety of the aircraft in that space. However, if the aircraft has a failure, for example, an engine failure, which means that it can no longer ensure the level of precision required in a precision approach or else for reasons of momentary or prolonged unavailability of the planned landing runway, the pilot may have to divert the aeroplane from an initial flight plan, in which case he must follow an interrupted approach procedure commonly referred to by the expression "missed approach" that will hereinafter be referred to as escape procedure. This procedure makes it possible to evacuate the runway or the space allocated to the trajectory of the aircraft by following a secured, so-called escape trajectory on which there is no risk of collision with another aircraft or with the reliefs in the airport area. In this procedure, the aircraft goes around to gain altitude.

A flight procedure corresponds to a flight plan, that the aircraft is assumed to follow between an initial position and a final position. A flight plan is a detailed description of the trajectory that the aircraft is assumed to follow. The trajectory includes a lateral trajectory which is generally characterized by a chronological sequence of segments linking pairs of waypoints described by their position in the horizontal plane and arcs of circle, both to handle the heading transitions between segments at the waypoints and to follow certain curved segments. The trajectory also includes a vertical trajectory, a trajectory in the vertical plane. The waypoints are characterized by their time of passage.

The aircraft are conventionally equipped with a flight management system, hereinafter referred to as FMS. The FMS is responsible for the design of the flight plans, the construction of the lateral trajectory and of the vertical trajectory. The vertical trajectory is obtained by the integration in the vertical plane of the position of the aircraft along this lateral trajectory in order to obtain predictions at the waypoints (altitude, speed, time, fuel predictions). The integration of a model of the aircraft is made possible by the provision by the aircraft manufacturer of the aerodynamic and motive parameters of the craft, stored in a "performance database" in the FMS system and guidance setpoints adapted to follow the flight plan. Currently, when a failure occurs, the FMS presents to the pilot, via a human-machine interface, one or more possible flight procedures that the aircraft could follow in the continuation of the flight. It is for the crew to choose the procedure that the aircraft will follow thereafter in light of the capabilities of the craft.

In addition to the escape procedures, the FMS may be required to present to the pilot omnidirectional departure procedures. In these procedures, the lateral trajectory to be followed is defined, not by a succession of points, but by one or more directions to be followed in the horizontal plane and, possibly, by the transition curves between two successive directions. A direction to be followed in the horizontal plane is commonly called a heading. An omnidirectional departure procedure is a procedure during which the aircraft is diverted from an initial flight plan from an initial position to an arrival position by following a first heading up to a given altitude and then a second heading up to the final position. In some airports, a departure authorization may include standardized instrument departure instructions, commonly called SID (Standard Instrument Departure). A standard instrument departure SID is a planned departure procedure originating from an air traffic control ATC authority, published in graphic and text form and intended for the pilots and the controllers. The SIDs handle the transition from the take-off position to a flight plan. The SIDs conventionally include two successive headings in the horizontal plane.

There are many constraints that affect the pilot, who must take into account a large volume of information before taking the decision to follow a flight procedure. The pilot must be able to select, by himself, with total awareness, a flight procedure that is assumed to have to be followed by the aircraft after the selection, that ensures the safety of the passengers. In order for the pilot to compare the capabilities of the aircraft with the capabilities required on a flight procedure, the FMS calculates, for the flight procedures that it presents to the pilot, a theoretical climb slope. The theoretical climb slope is the mean slope with which an aircraft must be capable of flying (in other words, the mean slope that the aircraft must be capable of flying) to ensure the safety of the passengers in the procedure. The term "slope" should be understood to mean the inclination of the aircraft, or of the trajectory followed by the aircraft, relative to the horizontal plane.

The pilot calculates a slope, called flyable slope or climb capability of the aircraft, with which the aircraft is able to move by means of tables grouped together in technical documentation. Each table links the values of the slope with which an aircraft is able to move with the various flight parameters such as the weight of the aircraft, the temperature, the altitude, the state of operation of the engines. The pilot then compares the flyable slope with the theoretical climb slope. He then chooses a flight procedure on which the theoretical climb slope is less than or equal to the flyable slope.

Calculating the slope that can be flown by the aircraft is a lengthy and tedious task. Searching through tables in the paper documentation takes time. It takes that much more time when the pilot wants to calculate a precise slope taking into account a maximum of parameters. He must look up a plurality of tables to calculate a precise slope according to the values of a plurality of flight parameters. Thus, the calculation of the flyable slope is imprecise if the pilot has only a limited time to perform his calculations. It is also unreliable, because the pilot may easily make calculation errors. Since the pilot uses the slope calculation as the basis for choosing a flight procedure, there is then no guarantee that the aircraft can follow the chosen procedure with the safety level required notably with regard to the relief. Having the task of calculating the flyable slope taken over by the onboard personnel is also not without risks. In critical stages of the flight, such as the approach phase or climb phase following take-off, the onboard personnel are already heavily stressed. The stress level is maximal because of the manoeuvres associated with the take-off or the go-around. It is also in these areas that the systems are most likely to raise alerts and inopportunely monopolize the attention of the piloting personnel.

SUMMARY OF THE INVENTION

An embodiment of the invention provides an aircraft piloting assistance method including a step for determining at least one slope with which the aircraft is assumed to be able to fly, based on a value of at least one flight parameter including the weight of the aircraft, the step for determining the slope or slopes with which the aircraft is able to fly, called flyable slope(s), is performed by means of a computer, and a step for presenting the flyable slope(s) to a decision-maker. The method according to the invention includes, if appropriate, at least one of the following characteristics:

at least one flyable slope is determined in addition based on the current position occupied by the aircraft and/or parameters associated with a flight procedure including a lateral trajectory, an end-of-procedure position, a vertical trajectory associated with the lateral trajectory and, possibly, a guidance constraint to be observed during the flight procedure, it includes a step for calculating the predicted value of at least one parameter representative of the flight conditions along the lateral trajectory and the vertical trajectory between the current position and the end-of-procedure position, based on the current value(s) of the parameter(s) representative of flight conditions, the value of at least one parameter representative of the flight conditions is equal to the current value of the parameter representative of the flight conditions, and/or the value of at least one flight parameter is derived from a manual input on the part of the crew or from an automatic input via air-ground digital data link from the airline or from control centres, at least one flyable slope is determined assuming that all the engines of the aircraft are operating or that at least one of the engines has failed, or else assuming that the state of operation of at least one engine is variable in the flight procedure, the step for determining at least one flyable slope is performed according to the value of at least one first flight parameter, by means of a mapping table linking the flyable slope with a plurality of values of the first flight parameter(s), and, possibly, based on the value of at least one second flight parameter, by means of a correction table linking correction values to be made to the flyable slope according to a plurality of values of the second flight parameter(s), the step for determining a flyable slope includes a prediction calculation step performed by integrating, on the lateral trajectory between the current position and the end-of-procedure position, an equation linking the vertical position of the aircraft or the slope of the aircraft with at least one flight parameter, the flyable slope(s) include at least one slope out of the mean slope, the minimum slope, the maximum slope, the instantaneous slope with which the aircraft is able to fly on the lateral trajectory extending between the current position and the final position for a predetermined value of the parameter representative of the operating state of the engines, the step for presenting the flyable slope(s) includes a step for displaying the value(s) of the flyable slope(s) on a display screen, the display screen also displays, possibly, at least one value and/or one alphanumeric character string representative of the value of at least one flight parameter and, possibly, one or more alphanumeric character string(s) representative of the flight parameter(s), the step for presenting the value(s) of the flyable slope(s) includes a step for transmitting the value(s) of the flyable slope(s) to an automatic piloting device, it includes a step for checking the capability of the aircraft to follow a flight procedure and, possibly, a step for alerting the pilot when the aircraft does not have the capability to follow the flight procedure, it is implemented automatically at regular time intervals, it is implemented when the decision-maker selects a flight procedure that he intends to follow or when an unforeseen event occurs that is likely to degrade the slope of the aircraft.

Another embodiment of the invention is a piloting assistance device including means able to implement the method according to the invention. The device possibly includes a flight management system or an onboard operational electronic documentation system or a central unit positioned on the ground.

The precision and reliability of the flyable slope calculations are enhanced because the computer can take into account a large number of flight parameters when calculating the flyable slope. In practice, in the prior art, the pilot took into account only the weight of the aircraft, the altitude of the airport or of the decision point (or trajectory change point), the temperature, the wind, the samples taken from the engines (air conditioning and anti-icing packs). In the method according to an embodiment of the invention, the calculation of the flyable slope and/or of the parameter values may be performed by integrating flight mechanics equations. The system may have all the aerodynamic and motive parameters stored in the performance database of the flight management system FMS. It may, for example, have drag, lift and thrust curves not available in the prior art. It may also have roll rates of the aeroplane along the trajectory (which influence the lift), not taken into account in the prior art. The method according to an embodiment of the invention makes it possible to take into account the impact on its slope of the variation of the value of a flight parameter all the more finely when the prediction function PRED is designed to join finer sections along the procedure, which is what most of the FMS systems currently present on the regional and business aeroplane market do. For example, there may be tables that make it possible to extract the drag or lift according to the altitude, the aircraft configuration and the weather. The method also makes it possible to take into account the impact on its slope of the position of the aircraft on its lateral trajectory (for example, the impact on its slope of the loss of lift and the impact of the change in the environment outside the aeroplane (wind, temperature for example) along its lateral trajectory.

The reliability of the flyable slope calculations is also enhanced because the calculation is performed by a computer. The decision-maker thus has reliable and accurate information in order to decide on the continuation of the path that the aircraft will follow, which makes it possible to limit the risks of not ensuring the safety of the aircraft and inopportune diversions because the performance levels of the aircraft are not sufficient to follow a procedure that it is in the process of following. The method according to an embodiment of the invention also makes it possible to relieve the pilot, by removing tasks from him, which has the effect of limiting his stress.

The choice of the escape procedure or of the future procedure may also be automated by virtue of the method according to the invention.

BRIEF DESCRIPTION OF THE DRAWINGS

Other features and advantages of the invention will become apparent from reading the following detailed description, given as a nonlimiting example and with reference to the appended drawings in which.

DETAILED DESCRIPTION

Figure 1:
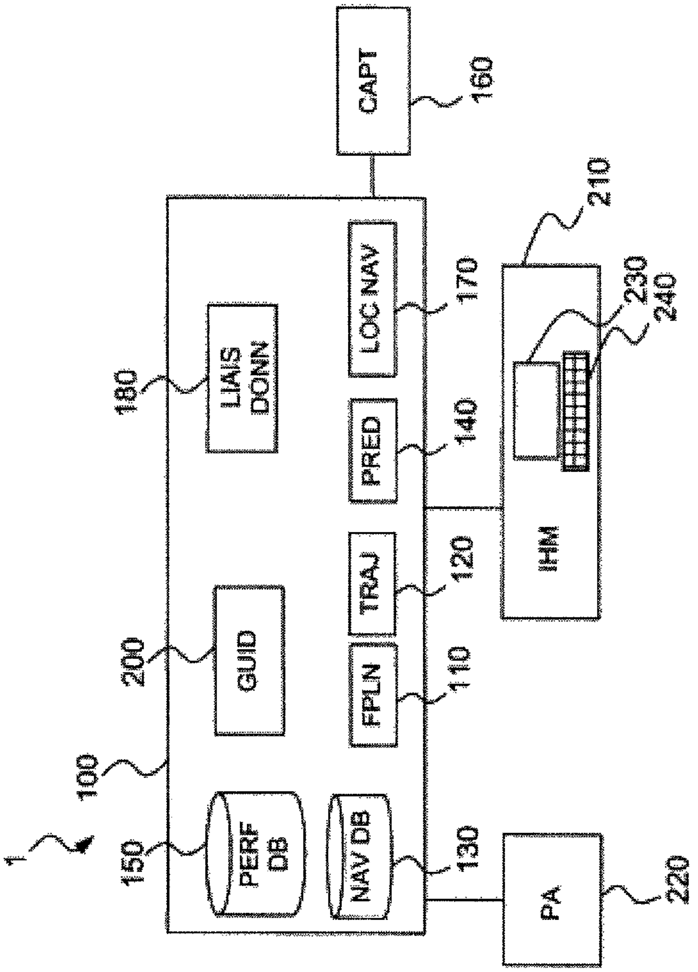
FIG. 1 diagrammatically represents a first embodiment of a device according to the invention, FIG. 2 diagrammatically represents an example of vertical trajectory of an aircraft according to the distance travelled on the lateral trajectory, FIG. 3 diagrammatically represents an example of a flyable slope display window.

An aspect of the method for assisting in aircraft flight management according to an embodiment of the invention enables a decision-maker to choose which flight plan or procedure he will choose to follow over the rest of his flight. The decision-maker is the one that chooses the procedure that the aircraft will follow; it may be an automatic piloting device, the pilot or an operator situated on the ground in an air traffic control authority. The term "operator" will be used to designate a pilot or an operator situated on the ground. FIG. 1 diagrammatically represents a device according to a first embodiment of the invention. This device includes an onboard flight management system 100, called FMS hereinafter. The aircraft are conventionally equipped with an FMS. The FMS is a computer that can determine the geometry of a flight plan (trajectory including a vertical trajectory and a lateral trajectory, speed profile) and capable of sending to the pilot or to the automatic pilot 220, the guidance setpoints for following this profile. Conventionally, an FMS includes all or some of the following functions:

- a location function LOCNAV, 170, linked to geo-location means CAPT, 160, (GPS, GALILEO, VHF radio beacons, inertial units) capable of calculating the current position and the current speed of the aircraft according to measurements transmitted by the geo-location means CAPT, 160,
- a flight plan calculation function FPLN, 110, capable of calculating geographic elements forming the sketch of the trajectory of a departure and an arrival procedure, such as, for example, waypoints, based on navigation data originating from a navigation database NAVDB, 130,
- a navigation database NAVBD, 130, including a point, beacon, intersection or altitude leg, and other such data,
- a performance database, PRFBD 150, containing aerodynamic and motive parameters of the craft,
- a lateral trajectory calculation module TRAJ, 120, capable of constructing a continuous lateral trajectory from points of the route to be followed originating from the calculation means FPLN, 110, in line with the performance levels of the aircraft and the confinement constraints possibly defined in the flight procedure,
- a prediction calculation function PRED, 140, capable of constructing an optimized vertical profile on the lateral trajectory constructed by the lateral trajectory calculation means TRAJ, 120, and the values of the aerodynamic and motive parameters of the craft originating from the performance database PRFDB, 150,
- a guidance function GUID 200 capable of generating guidance setpoints for controlling the aerodynamic and engine equipment of the aircraft to guide the aircraft in the lateral and vertical planes on a trajectory formed by a lateral trajectory and a vertical trajectory, while optimizing its speed,
- a digital data link LIAIS DONN, 180, for communicating with the control centres, the airlines and the other aircraft.

The FMS is conventionally linked to a human-machine interface HMI, 210, conventionally including one or more display screens 230, and one or more input keyboard(s) 240.

The method according to an embodiment of the invention includes a step for determining, by means of a computer, at least one flyable slope, with which the aircraft is assumed to be able to fly, based on a value of at least one flight parameter including at least one parameter representative of the flight conditions, including the weight of the aircraft and a step for presenting the flyable slope(s) to a decision-maker.

By implementing the method according to an embodiment of the invention by means of the device 1 according to the first embodiment of the invention, the values of the parameters conventionally stored in a flight management system, such as the aerodynamic and motive parameters of the aircraft and its calculation capabilities, are advantageously exploited to perform its routine tasks of calculating flight plans and of generating suitable guidance setpoints for the aircraft to follow the flight plan (lateral trajectory calculation function TRAJ, prediction module PRED and, possibly, GUID). The method according to an embodiment of the invention possibly includes a step for calculating, by means of the guidance module GUID, altitude and/or speed and/or thrust setpoints to follow the lateral and vertical trajectories, and a step for sending these setpoints to the automatic pilot, so as to ensure that the aeroplane will climb with a slope corresponding to the flyable slope extracted from the calculation. In this embodiment, the method according to an embodiment of the invention is implemented by a device including an FMS.

We will first describe the flight parameters of an aircraft that can be used as a basis for calculating the flyable slopes. The flight parameters include at least one parameter representative of the flight conditions of the aircraft taken from the meteorological parameters, the motive parameters of the aircraft and from the aerodynamic parameters of the aircraft. The aerodynamic parameters of the aircraft, for example stored in the performance database PERFDB, include at least one parameter out of the maximum speed of the aircraft, its turn radius, the maximum altitude of the aircraft, the take-off speed of the aircraft, the take-off distance, the stall speed of the aircraft, the weight of the aircraft, the position of the centre of gravity of the aircraft, the current position of the aircraft, the drag and lift curves. The aerodynamic parameters also include the position of the following equipment items: landing gear, flaps and leading edge slats which act on the drag of the aircraft or on its lift: the landing gear, when lowered, increase the drag, the leading edge slats and/or flaps, when lowered, increase the lift by varying the camber of the wings of the aircraft. The configuration of the equipment items corresponds to their respective position, namely retracted, that is to say (flat or in extension of the wings for the leading edge slats and flaps) or extended (namely presenting an angle projecting from the wings for the leading edge slats and the flaps).

The motive parameters of the aircraft include the configuration of the equipment likely to act on the slope of the aircraft. These are the state of operation of the engines and the configurations of the auxiliary equipment items of the aircraft likely to affect the value of the slope of the aircraft including the configurations of at least one equipment item out of the anti-ice device designed to protect the wings or the engines from ice. The air-conditioning packs take air from the engines, thus affecting the resulting thrust. The anti-ice devices take air from the engines, they therefore act on the power available to move the aircraft and therefore on the value of the slope with which the aircraft can fly. The configuration of the above-mentioned equipment items may take several values: on, on with a given power, off.

The meteorological parameters include at least one parameter out of the outside temperature and wind. They are, for example, measured by means of sensors CAPT, 160.

The flight parameters also possibly include the current position of the aircraft and/or one or more parameters linked to one or more flight procedures, namely, for each procedure, a lateral trajectory and a vertical trajectory (derived, for example, from the flight plan functions FPLN which extract the procedure elements from the navigation database NAVDB) and an end-of-procedure position, as well as, possibly, a guidance constraint associated with the procedure. The guidance constraints are calculated by the flight management system FMS on the basis of information stored in configuration tables (not represented in FIG. 1) or else input by the pilot using his human-machine interfaces. Such information is, for example, the thrust reduction altitude. The end-of-procedure position is not necessarily the position at which the procedure ends. It is the position at which the calculation ends.

The current position, derived, for example, from a location function LOCNAV, and the end-of-procedure position are described either by their positions in the horizontal plane and/or their respective altitudes, or by the height or the position of one of the positions (initial or final) and respectively by the height separating them or the ground distance separating them.

The expression "guidance constraint" should be understood to mean a constraint associated with a determined procedure type. For example, when the flight procedure is of the low-noise type (aiming to limit noise pollution in the vicinity of the airports or in the axis of the climb), the constraint in guidance terms includes in imposing on the aircraft constraints in terms of thrust and speed, climb slope triggering altitudes. In a low-noise type take-off, the aircraft must follow a take-off procedure followed by a climb with, from the take-off, an optimum thrust up to a thrust reduction altitude, and an acceleration from an acceleration altitude. These constraints make it possible to consider an aeroplane drag setting, concerning the configuration of the flaps. The other constraints involved in a departure or go-around procedure relate to the speed or the altitude on passing the waypoints on the flight plan. During a take-off procedure including an acceleration up to take-off and a climb following the take-off, the length of the runway is also a constraint.

The flight parameter values are, for example, derived from the sensors CAPT, 160 for navigation, or else from databases (navigation and performance database). These values of the flight parameters are derived from manual inputs by the crew (for example by means of the keyboards 240 of the human-machine interface 210) or from automatic inputs via air-ground digital data links from the airline or from control centres, or else derived from conventional calculations (current position, trajectory or flight plan calculation function), or else from calculations dedicated to the calculation of the flyable slopes.

In other words, the values of the flight parameters, notably the values of the parameters representative of the flight conditions, are, for example, values dedicated to the flight plan calculation, namely dedicated values input manually or automatically (for example, in the case of a take-off procedure, it is possible to set the altitude of the end-of-procedure position to 10 000 feet by default) or else values derived from calculations dedicated to the calculation of the flyable slopes for a given flight procedure. The values of the parameters may also be current values of the flight parameters such as the position of the aircraft and the current values of the parameters obtained from the performance or navigation databases. The values of the flight parameters representative of the flight procedures are advantageously obtained from the lateral trajectory, flight plan, prediction and, possibly, guidance calculation modules.

When the flyable slope of an aircraft is determined from a current value of a flight parameter, this is tantamount to making an assumption whereby the value of the flight parameter does not change on the future trajectory. For example, it is assumed that, even if the aircraft gains height, the temperature does not change. It is also assumed that the position of the flaps is always the same on the trajectory and is equal to the current position.

When a flyable slope is calculated from dedicated values of flight condition representative parameters obtained from dedicated calculations for a determined flight procedure, the method according to an embodiment of the invention includes, prior to the step for determining flyable slopes, a step for calculating, by prediction on a predetermined flight procedure, predicted values of the parameters representative of the flight conditions concerned, based on their respective current values, from the current position of the aircraft to the end-of-procedure position. It is conventionally obtained by integrating the value of the parameter, based on its current value along the flight procedure. The predicted value of a flight parameter, on a determined flight procedure, corresponds to the succession of values taken by the parameter between the current position and the end-of-procedure position. The calculation of the value of the flight parameters by prediction is performed by the PRED module which has a modelling of the aircraft in the form of flight mechanics equations and integrates these equations digitally by using the aerodynamic and motive parameters representative of the type of craft and its configuration, supplied in the performance database and, possibly, the meteorological parameters. The aerodynamic and motive parameters are calculated by the aircraft manufacturer by virtue of wind tunnels, flight tests or simulations. The meteorological parameters used in the integration are either input by the pilot using his human-machine interface based on weather maps supplied by his airline or by a weather data provider, or received by digital data link from his airline or from a weather data provider. They usually include the trend as a function of altitude of the predicted winds and temperatures. The predicted wind, the predicted temperature, the position of the flaps on the flight plan associated with the flight procedure are thus also calculated, for example. The value of the parameter is then determined from its predicted value. Either the value of the parameter is equal to the predicted value, or it is equal to the average of the predicted value over the flight procedure.

In the method according to an embodiment of the invention, two slopes are advantageously calculated for two different operating states of the engines (that is to say, for two different values of the parameter representing the number of engines operating) for identical values of other flight parameters. A first flyable slope is, for example, calculated by assuming that all the engines of the aircraft are operating, and a second flyable slope is calculated assuming that an engine has failed. The failed engine is, preferably, the critical engine. The critical engine is the one whose failure most degrades the performance levels of the aircraft. A good estimation of an upper limit and of a lower limit of the slope with which the aircraft is able to gain altitude is thus obtained. When the pilot assesses the capacity of the aircraft to follow a procedure based on a slope equal to the lower limit of the slope that the aircraft is able to fly, it is assured of not over-assessing the slope with which the aircraft is able to fly. The risks that the pilot may choose to follow a procedure that the aircraft is not capable of flying are thus limited. As a variant, the slope is determined on the basis of a variable value of the number of engines operating during a flight procedure. In other words, all the engines are operating on a first portion of the trajectory and at least one engine has failed on a second portion of the trajectory. In the case of a take-off procedure, it is assumed, for example, that all the engines are operating before the take-off and that an engine fails after the take-off. The aim of this variant is to assess the slope in failure mode with an engine not delivering thrust, reflecting the case of engine failure on take-off. In the case of instrument departures, the flight procedure, notably the trajectory, to be considered depends on the number of engines in operating state.

There now follows a description of the first step for determining one or more flyable slopes. There are two methods for calculating a slope that can be flown by the aircraft. A first method includes in determining the value of the flyable slope from tables. More specifically, a first value of the flyable slope is determined according to the value of at least one first parameter, from a mapping table linking values of the flyable slope with a plurality of values of the first parameter(s). Corrections are then advantageously made to this first value, according to the value of at least one second parameter, from a correction table linking correction values to be made to the flyable slope with a plurality of values of the second parameter.

The tables are, for example, crossed tables which link various flyable slope values according to different values of several flight parameters. In this case, the flyable slope is calculated from a single mapping table. As a variant, the mapping tables supplied by the aircraft manufacturer are similar to the tables listed in the paper documentation of the prior art. A flyable slope is advantageously determined in two steps as explained previously. In practice, the mapping tables link a flyable slope, more specifically the guaranteed slope, to several values of a first flight parameter, for determined values of second flight parameters. The guaranteed slope is the slope with which it is guaranteed that the aircraft is able to fly. For example, a mapping table links the value of the slope to several values of the weight of the aircraft for a determined temperature, on a straight trajectory, without wind, with auxiliary equipment items off, etc. If there is wind or if the value of the temperature is different from the determined temperature, the value of the slope is corrected according to the value of the temperature based on a dedicated correction table. It is also possible to correct the slope according to turns present on the trajectory, the value of the wind, the real altitude of the aircraft, the thrust, the operation of the anti-ice systems, etc. Using a computer to perform this operation makes it possible to calculate a precise flyable slope quickly and reliably by taking into account the values of a high number of flight parameters.

A second method for calculating a flyable slope includes in calculating the flyable slope by prediction by integrating, on a lateral trajectory between the current position of the aircraft and the end-of-procedure position, an equation linking the vertical position of the aircraft or the slope of the aircraft with at least one flight parameter. To this end, the device according to the invention includes a means for storing the equation and a prediction calculation means. The prediction calculation is advantageously performed from the prediction module PRED, the equations that are integrated are conventional equations used by the prediction module to calculate a vertical trajectory linked to a given lateral trajectory. When the lateral trajectory depends on the vertical trajectory, for example, in the case of omnidirectional departures in which the transition between two successive headings takes place at a given height. The equation is integrated along a first heading until the estimated vertical position (which is also the integral of the estimated slope) corresponds to the transition altitude, then it is integrated according to the second heading.

A simple equation includes in linking the estimated instantaneous slope Pie, the weight M of the aircraft, the thrust T, the drag D and the weight of the aircraft as follows: Pie=Arcsin ((T−D)/M) in which the drag is linked to the lift by a known so-called polar equation.

When the vertical position of the aircraft is integrated on the trajectory, an estimated vertical trajectory is obtained. By a conventional derivative calculation, the values of the estimated instantaneous slopes on the lateral trajectory are obtained. From the curve representing the estimated instantaneous slope according to the position on the lateral trajectory, it is also possible to calculate the mean slope and/or the minimum slope of the aircraft on the trajectory, for a determined number of engines in operating state. This method makes it possible to take into account, with greater accuracy than the first method, variations of the values of the various parameters on a trajectory. It also makes it possible to calculate the instantaneous value of the slope that can be flown by the aircraft on the lateral trajectory, in particular when the values of the parameters change.

The flyable slope during a flight procedure is a slope that the aircraft is able to fly on a flight procedure; it is either the instantaneous slope or the mean slope, the minimum slope or the maximum slope that the aircraft is able to fly on the lateral trajectory for a determined number of engines in operating state.

The computer calculates the climb slope in one or more measurement units, for example as a %; in degrees and/or in feet per nautical mile by means of the following mapping table: a slope of 3 degrees is equivalent to a slope of 300 feet per nautical mile or a slope of 5.2%. Hereinafter in the text, the feet per nautical mile unit will be denoted "ft/Nm".

Advantageously, a mean flyable slope Pem is calculated on a given flight procedure characterized by an initial position and a final position separated by a height Dalt and a ground length Dist, by subdividing the procedure into a given number N of successive portions POi having successive ground lengths Disti. Portions are chosen on which the values of the flight parameters are substantially set or on which the variation of the flight parameter values does not act on the value of the slope of the aircraft. The successive portions are chosen such that the flyable slopes are different over two successive portions. In other words, at least one flight parameter differs between two successive portions. This method makes it possible to take account of the trend of the values of the flight parameters on the flight trajectory in order to obtain more accurate flyable slopes. It is particularly advantageous when the first calculation method is used.

Figure 2:
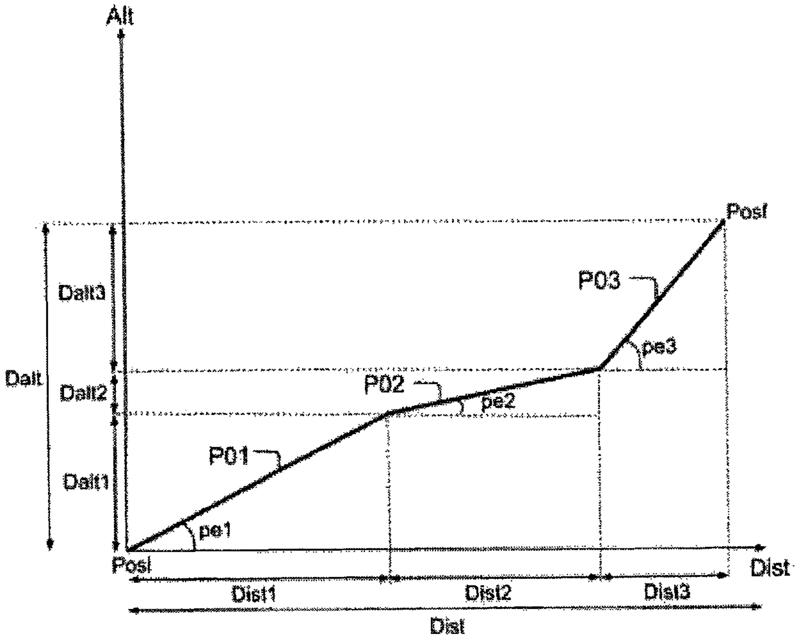

FIG. 2 shows, according to the distance Dist, travelled on a lateral trajectory, a vertical trajectory obtained on a determined flight procedure. The flight procedure is, for example, a climb procedure, between its current position Posi and a final position Posf during which the aircraft is assumed to follow a given lateral trajectory including, in succession, a first straight line, a turn and a second straight line of successive individual lengths Dist1, Dist2, Dist3 on the lateral trajectory. The thrust, the configuration of the flaps and leading edge slats and of the wings and the value of the roll exhibit, for example, the following sequencing on a first individual portion PO1 corresponding to a first straight line: wings flat, thrust maximum (for take-off), flaps extended; a second individual portion PO2 corresponding to a turn: aeroplane in roll, maximum thrust, leading edge slats and flaps extended; a third individual portion PO3 corresponding to a second straight line: thrust reduced to climb thrust, leading edge slats and flaps extended. The three successive trajectory portions extend over blocks of successive heights Dalt1 equal to 700 feet, Dalt2 equal to 300 feet, Dalt 3 equal to 400 feet. The individual lengths are equal to 1 nautical mile. To calculate the mean flyable slope on the flight procedure, a step for calculating the average of the successive individual slopes pe1, pe2, pe3 on the three trajectory portions, weighted according to the successive individual lengths Dist1, Dist2, Dist3, is performed.

The mean flyable slope Pem is given by the following formula from the individual lengths, the individual slopes and the number of individual portions:

$$Pem = \sum_{i=1}^{i=N} pei \cdot Disti \Big/ \sum_{i=1}^{i=N} Disti$$

in which pei=Dalti/Disti, Dalti is the altitude difference between the start and end of the portion i.

By applying the preceding formula, the mean slope in the above example is equal to: 700*1+300*1+400*1/(1+1+1)= 467 feet per nautical mile. As a variant, the mean slope is obtained by dividing the altitude difference Dalt between the initial position and the final position by the distance Dist travelled between these two points. In this case, the final position is located at an altitude of 1400 feet, the initial position at an altitude of 0 nautical miles and the initial point and the final point are separated by 3 nautical miles. The mean slope is therefore equal to 1400/3=467 feet per nautical mile.

It should be noted that a flyable slope is, by definition, the slope with which the aircraft is able to fly after the take-off. Flyable slopes are calculated only on trajectory portions over which the aircraft flies, that is to say, after having travelled the take-off distance (which is the distance that the aircraft must travel to take off). When a slope with which the aircraft is able to fly is calculated on a trajectory or a trajectory portion, the take-off distance is subtracted from the length of the lateral trajectory or of the lateral trajectory portion which includes the take-off. The take-off length is obtained via tables or by integration (it is the length of the lateral trajectory on which the slope is less than a predetermined threshold).

Figure 3:
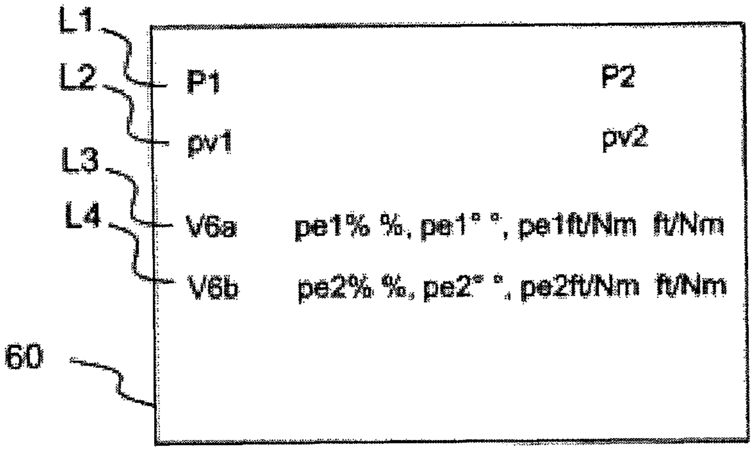

The second step of the method includes, for example, in presenting the value(s) of the flyable slopes to a decision-maker. Advantageously, this step includes a step for displaying the values of the flyable slopes on a display window of a display screen 230 of the human-machine interface. Preferably, the value(s) of the flyable slopes are displayed in their context. In other words, the display screen also displays at least one alphanumeric character string representative of the value of a parameter from the set of parameters on the basis of which the flyable slope(s) has (have) been determined and, possibly, at least one alphanumeric character string representative of a flight parameter from the set of parameters. FIG. 3 shows an example of a textual display window 60 on which two flyable slope values are displayed, calculated from two sets of parameters having common values except for the number of engines in operating state. In this example, the display window displays, on a first line L1, two first character strings P1 and P2 (for example "TO" and "ARPT ELEV") respectively associated with two first flight parameters V1, V2 respectively equal to the altitude of the final position and to the altitude of the departure airport. The first two respective values pv1, pv2 are, for example, respectively equal to 1850 feet and 11 000 feet. These values are displayed along a second line L2 under the associated character string P1, P2. The window also displays, on a third line L3 and a fourth line L4, the respective values of two flyable slopes in 3 respective measurement units: pe1%, pe1°, pe1 ft/Nm (feet per nautical mile) respectively equal to 8.3%; 4.8°; and 501 feet per nautical mile and pe2%, pe2°, pe2 respectively equal to 5.2%, 3° and 300 feet per nautical mile. The respective values are followed by the values of their respective units, namely as a percentage %, in degrees °, in feet ft per nautical mile Nm (denoted "ft/Nm" on the screen). The values of the slopes being preceded by character strings representing respective values V6*a*, V6*b* of a sixth parameter P6, equal to the number of engines operating (namely all the engines operating "ALL ENGINES" and one engine operating "ONE ENGINE"), on the basis of which the first and second slopes have been respectively calculated.

The window displaying the flyable slopes is, for example, displayed at the request of the operator, by means of a human-machine interface keyboard. The step for presenting the flyable slope may, in addition to the display, or instead of the display, present a step for transmitting the value(s) of the flyable slope(s) to an automatic piloting device PA, 220, which uses this information to choose the flight procedure that the aircraft will follow.

Advantageously, the flyable slope(s) is (are) for example calculated on the future portion (up to an end position) of the current flight plan (active flight plan). As a variant, the flyable slope(s) is (are) calculated on a predetermined flight procedure which could begin at the current position, for example, in case of engine failure.

The method according to an embodiment of the invention is advantageously implemented automatically at regular time intervals so that the decision-maker permanently knows the flight capabilities of the aircraft on the flight plan or on a new flight procedure. As a variant, the method is implemented at the moment when the decision-maker selects a flight procedure that he intends to follow. As a variant, it is automatically implemented when an unforeseen event likely to degrade the slope of the aircraft occurs (for example, when an engine failure occurs). As a variant, it intervenes automatically when an instrument or omnidirectional departure procedure is presented to the pilot, for example in the pre-flight phase.

In an automated version of the method according to the invention, the method also advantageously includes a step for checking the capability of the aircraft to follow a given flight procedure. This step includes, for example, a step for comparing the value of the flyable slope(s) with a predetermined theoretical climb slope with which the aircraft must be capable of flying on a determined procedure. This step also possibly includes a step for checking that one or more additional constraints are observed. A check is carried out, for example, to ensure that the constraints are satisfied based on the flyable slope(s) calculated on the flight procedure.

For example, on an escape procedure, a constraint includes in requiring the aircraft to be above a minimum safety altitude MSA within a given radius, for example 25 nautical miles, around the airport. A check is made to see whether the aircraft could satisfy this constraint by estimating the height of the aircraft on the flight procedure based on a flyable slope. Preferably, a check is made to see if the constraint is observed based on the weakest flyable slope calculated. The method possibly includes a step for alerting the pilot when the aircraft does not have the capability to follow a flight procedure. This variant enables the crew to anticipate an inability to fly a procedure in the MSA sector concerned and to dialogue with control as early as possible in order to possibly change sector in its take-off or escape procedure.

Another embodiment of the present invention provides a device including means able to implement the method according to the invention, notably a means of calculating flyable slopes and possibly a means of calculating flight parameters, as well as a means of displaying the flyable slope(s). Advantageously, as described previously, the device includes an FMS. As a variant, the device includes an onboard operational electronic documentation system, called EFB (Electronic Flight Bag) possibly linked to other avionics systems, such as an FMS, to acquire the values of some of the flight parameters. In practice, an EFB conventionally includes calculation capabilities and a human-machine interface that can be used to input flight parameter values and display the flyable slopes. As a variant, the device includes a central unit situated on the ground. This central unit is possibly linked to the aircraft by a ground/onboard communication system. The human-machine interface is, in this case, either on the ground, or in the cockpit of the aircraft. The decision-maker in all cases remains the crew onboard the aircraft.

The present invention is not limited to the embodiments described herein; reference should be had to the appended claims.

The invention claimed is:

1. A method for assisting aircraft piloting, the aircraft following a flight procedure comprising a lateral trajectory having an associated end of procedure position and vertical trajectory, the method comprising the steps of:

- determining a mean flyable slope that an aircraft is assumed to be able to fly, based on a value of a weight of the aircraft and on values of flight parameters associated with said flight procedure, said determining step being performed by a computer;
- the flight procedure being divided into a plurality of successive portions, each portion having an individual ground length on a lateral trajectory and a height, each said portion being chosen such that at least one of said flight parameters differs between at least two successive portions;
- the step of determining said mean flyable slope further comprising sub-steps for:
  - calculating an individual slope for each said portion; and
  - calculating an average of said individual slopes weighted according to the corresponding individual ground lengths, said average corresponding to said mean flyable slope; and
- presenting said mean flyable slope to a decision-maker by displaying a value of the mean flyable slope on a display screen.

2. The method for assisting aircraft piloting as recited in claim 1, wherein the mean flyable slope is further determined based on at least one of a current position occupied by the aircraft and a guidance constraint to be observed during said flight procedure.

3. The method for assisting aircraft piloting according to claim 2, wherein the mean flyable slope is determined assuming that a state of operation of at least one engine of the aircraft is variable in said flight procedure.

4. The method for assisting aircraft piloting according to claim 1, wherein values of the flight parameters are equal to current values of said flight parameters.

5. The method for assisting aircraft piloting according to claim 1, wherein a value of at least one flight parameter is derived from manual input or from an automatic input via an air-ground digital data link.

6. The method for assisting aircraft piloting according to claim 1, wherein the mean flyable slope is determined assuming that all engines of the aircraft are operating or that at least one of the engines has failed.

7. The method for assisting aircraft piloting according to claim 1, wherein the step for determining the mean flyable slope is further performed according to a value of at least one first flight parameter by means of a mapping table linking the mean flyable slope with a plurality of values of said at least one first flight parameter.

8. The method for assisting aircraft piloting according to claim 7, wherein the mean flyable slope is further determined based on a value of at least one second flight parameter by means of a correction table linking correction values to be made to the mean flyable slope according to a plurality of values of said at least one second flight parameter.

9. The method for assisting aircraft piloting according claim 1, wherein said display screen also displays at least one of at least one value and one alphanumeric character string representative of a value of at least one flight parameter.

10. The method for assisting aircraft piloting according to claim 1, wherein the step for presenting a value of the mean flyable slope further comprises a step for transmitting the value of the mean flyable slope to an automatic piloting device.

11. The method for assisting aircraft piloting according to claim 1, further comprising a step for checking a capability of the aircraft to follow a flight procedure or a step for alerting a pilot when the aircraft does not have a capability to follow said flight procedure.

12. The method for assisting aircraft piloting according to claim 1, said method being implemented automatically at regular time intervals.

13. The method for assisting aircraft piloting according to claim 1, said method being implemented when the decision-maker selects a flight procedure to follow or when an event occurs that is likely to degrade a slope of the aircraft.

14. A piloting assistance device comprising a programmed processor and a memory with instructions which cause the processor to:

- determine a mean flyable slope that an aircraft is assumed to be able to fly, based on a value of a weight of the aircraft;
- wherein the instructions further cause the processor to calculate the mean flyable slope according to flight parameters associated with a flight procedure comprising a lateral trajectory having an associated end-of-procedure position and vertical trajectory, the flight procedure being divided into a plurality of successive portions, each portion having an individual ground length on a lateral trajectory and a height, each said portion being chosen such that at least one of said flight parameters differs between at least two successive portions, the instructions for causing the processor to calculate the mean flyable slope further comprising sub-steps for:

calculating an individual slope for each said portion; and calculating an average of said individual slopes weighted according to the corresponding individual ground lengths, said average corresponding to said mean flyable slope; and present the mean flyable slope to a decision-maker by displaying a value of the mean flyable slope on a display screen.

15. The device according to claim 14, further comprising a flight management system.

16. The device according to claim 14, further comprising an onboard operational electronic documentation system.

17. The device according to claim 14, further comprising a central unit positioned on the ground.

* * * * *